G. M. DRISDALE.
REFRIGERATOR CAN.
APPLICATION FILED JUNE 26, 1908.
929,408.
Patented July 27, 1909.
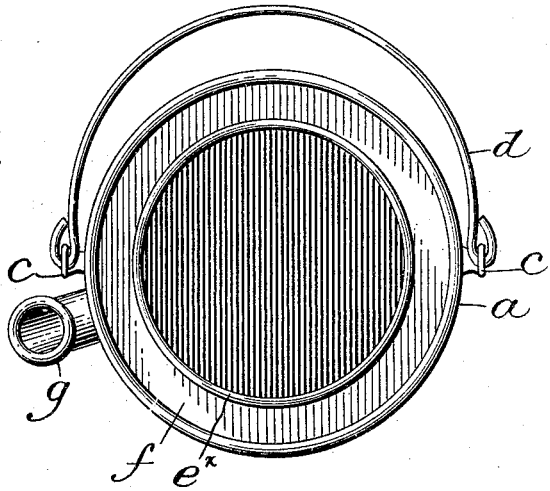
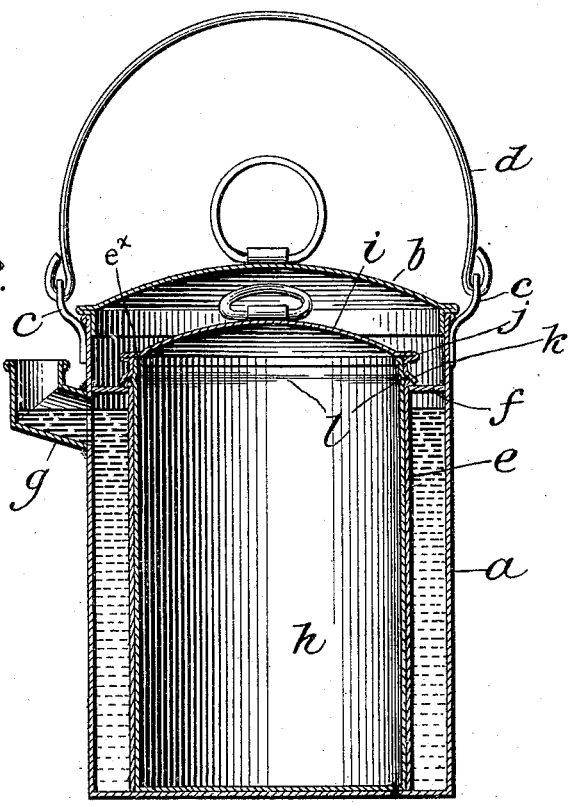

UNITED STATES PATENT OFFICE.

GOODLOE M. DRISDALE, OF TUSCUMBIA, ALABAMA.

REFRIGERATOR-CAN.

No. 929,408. Specification of Letters Patent. Patented July 27, 1909.

Application filed June 26, 1908. Serial No. 440,490.

*To all whom it may concern:*

Be it known that I, GOODLOE M. DRISDALE, a citizen of the United States, residing at Tuscumbia, in the county of Colbert and State of Alabama, have invented certain new and useful Improvements in Refrigerator-Cans, of which the following is a specification.

The object of the invention is to provide a refrigerator can for storing and transport of ice cream, milk and other perishable commodities, whereby the said commodities are contained in the removable vessel adapted to be inserted within an outer can which latter is provided with a closed chamber surrounding the removable vessel adapted to receive a cooling medium.

In the accompanying drawing, Figure 1 is a plan view of the outer receptacle with the cover removed. Fig. 2 is a vertical section through the apparatus showing the relative arrangement of the outer receptacle, the inner vessel and the space for containing the cooling medium.

Referring to the drawing, $a$ indicates the outer receptacle which may be conveniently formed of sheet metal, wood, wood fiber or any other suitable material in a bucket-like shape having a removable cover $b$ and provided with ears $c$ and bail $d$. Said outer receptacle contains an inner receptacle formed by a concentric inner wall $e$ attached to the bottom of the outer receptacle and secured to the sides thereof at a point some distance below the top by an annular wall or partition $f$, so as to form between said inner and outer receptacles a generally annular closed space to receive salt water, broken ice or any other suitable form of cooling medium, said cooling medium being introduced into the annular space through a spout or opening $g$ located at one side of the can. At the line of jointure between the upper edge of the wall $e$ and the horizontal partition $f$, there is preferably formed a bead $e^x$, the purpose of which will be hereinafter explained.

Within the inner receptacle $e$, there is located a removable vessel $h$ which preferably conforms generally to the shape of the said receptacle $e$, and is provided with an annular extension $l$ adapted to engage the upper rim of said inner receptacle $e$ to support said vessel $h$ within the inner receptacle should the former not be sufficiently long to reach the common bottom of receptacles $a$ and $e$. Said vessel $h$ is provided with a removable cover $i$ having an annular flange $j$ for strengthening the same, of the usual form, which is extended downwardly to form a pendent rim $k$ which is flared outwardly to overlie and engage the bead at the top of the receptacle $e$, so that said cover $i$ serves the purpose of sealing both the inner vessel $h$ and the inner receptacle $e$.

The mode of using the apparatus as herein described is as follows:—The inner vessel $h$ is removed from the container $a$ and filled with ice cream or other material which is to be preserved or kept cool. The annular space between outer receptacle $a$ and inner receptacle $e$ is filled with a suitable cooling medium through the spout or opening $g$. The inner vessel $h$ is then placed within inner receptacle $e$ and the cover $i$ applied thereto so as to seal the mouth of said vessel $h$ and also the space between the walls of vessel $h$ and inner receptacle $e$, the outwardly flaring flange $k$ of cover $i$ serving the latter purpose. The cover $b$ is then applied to the main can or receptacle $a$ and the apparatus is ready for use, the body of cooling medium occupying the annular space between the walls $a$ and $e$ serving to retain the contents of vessel $h$ in proper condition.

What I claim is:—

A refrigerator can comprising an outer receptacle, an inner receptacle of less height than the outer receptacle, a horizontal wall extending between the top of the inner receptacle and the wall of the outer receptacle and closing the top of the annular space or chamber between the inner and outer receptacles, said chamber having a side opening through which it may be charged, a removable vessel fitting within the inner receptacle, a cover for sealing the removable vessel and the inner receptacle and having a flange or rim extending over and seated on the upper edge of the latter, and a cover for the outer receptacle.

In testimony whereof I affix my signature in presence of two witnesses.

GOODLOE M. DRISDALE.

Witnesses:
C. A. LEFTWICH,
A. D. GIVEN.